(12) United States Patent
Lacombe et al.

(10) Patent No.: US 8,967,540 B2
(45) Date of Patent: Mar. 3, 2015

(54) ANTI LATERAL-TORSIONAL BUCKLING STRUCTURAL MEMBER OF AN AIRCRAFT FUSELAGE

(71) Applicant: Airbus Operations (S.A.S), Toulouse (FR)

(72) Inventors: Jean-Claude Lacombe, Blagnac (FR); Laurent Giuseppin, Finhan (FR)

(73) Assignee: Airbus Operations SAS, Toulouse (FR)

( * ) Notice: Subject to any disclaimer, the term of this patent is extended or adjusted under 35 U.S.C. 154(b) by 165 days.

(21) Appl. No.: 13/716,903

(22) Filed: Dec. 17, 2012

(65) Prior Publication Data

US 2013/0164465 A1    Jun. 27, 2013

(30) Foreign Application Priority Data

Dec. 21, 2011   (FR) ...................................... 11 62138

(51) Int. Cl.
*B64C 1/00*     (2006.01)
*B64C 1/06*     (2006.01)
*B64C 1/40*     (2006.01)

(52) U.S. Cl.
CPC . *B64C 1/061* (2013.01); *B64C 1/06* (2013.01); *B64C 1/406* (2013.01); *B64C 2001/0081* (2013.01)
USPC .......................... 244/129.1; 244/119; 244/131

(58) Field of Classification Search
USPC ......... 244/129.1, 119, 131, 132, 123.4, 123.1
See application file for complete search history.

(56) References Cited

U.S. PATENT DOCUMENTS

| | | | | |
|---|---|---|---|---|
| 1,907,002 | A | * | 5/1933 | Ragsdale ...................... 403/387 |
| 1,922,371 | A | * | 8/1933 | Jones ........................ 244/102 R |
| 2,755,216 | A | * | 7/1956 | Lemons ....................... 156/155 |
| 2,941,760 | A | * | 6/1960 | Arnold .......................... 244/119 |
| 4,671,470 | A | * | 6/1987 | Jonas ............................ 244/119 |
| 8,096,503 | B2 | * | 1/2012 | Verweyen ..................... 244/119 |
| 2005/0211847 | A1 | * | 9/2005 | Pattie et al. ................ 244/129.1 |
| 2005/0224650 | A1 | * | 10/2005 | Reed et al. .................... 244/119 |
| 2008/0111024 | A1 | * | 5/2008 | Lee et al. ...................... 244/121 |
| 2008/0128550 | A1 | * | 6/2008 | Roming et al. ............... 244/119 |
| 2008/0295334 | A1 | * | 12/2008 | Kulesha ....................... 29/897.2 |
| 2009/0026318 | A1 | * | 1/2009 | Gross et al. ................... 244/131 |

(Continued)

FOREIGN PATENT DOCUMENTS

| | | |
|---|---|---|
| DE | 10 2006 002 248 | 7/2007 |
| EP | 2 343 237 | 7/2011 |
| WO | 2009/037006 | 3/2009 |

OTHER PUBLICATIONS

French Search Report dated Sep. 17, 2012.

*Primary Examiner* — Christopher P Ellis
*Assistant Examiner* — Medhat Badawi
(74) *Attorney, Agent, or Firm* — Dickinson Wright PLLC

(57) ABSTRACT

A frame of an aircraft fuselage structure made from composite material, which includes a skin and several stringers fixed on the skin. The frame includes a profile elongated in a longitudinal direction which is hollow over at least a portion of its length. The profile is mounted on two legs. Each leg, intended to be fixed on the skin, includes a first portion extending continuously over the whole length of the profile and a second portion extending from this continuous portion so as to form several openings spaced apart in the longitudinal direction of the profile, in each of which a stringer passes. The presence of the hollow profile in the frame and the structure of the legs makes it possible to dispense with clips and cleats.

14 Claims, 2 Drawing Sheets

(56) References Cited

U.S. PATENT DOCUMENTS

| | | | |
|---|---|---|---|
| 2009/0146008 A1* | 6/2009 | Thiele | 244/119 |
| 2010/0102171 A1* | 4/2010 | Osorio et al. | 244/129.1 |
| 2010/0148003 A1* | 6/2010 | Verweyen | 244/119 |
| 2010/0264272 A1* | 10/2010 | Cazeneuve et al. | 244/131 |
| 2010/0264273 A1* | 10/2010 | Gallant et al. | 244/132 |
| 2010/0320319 A1* | 12/2010 | Liguore et al. | 244/119 |
| 2010/0327113 A1* | 12/2010 | Marquez Lopez et al. | 244/119 |
| 2011/0094663 A1* | 4/2011 | Guille et al. | 156/242 |
| 2011/0159242 A1* | 6/2011 | Arevalo Rodr guez | 428/157 |
| 2011/0159248 A1* | 6/2011 | Arevalo Rodr guez et al. | 428/174 |
| 2011/0185555 A1* | 8/2011 | Gallant et al. | 29/428 |
| 2012/0211602 A1* | 8/2012 | Dugerie et al. | 244/119 |
| 2013/0009008 A1* | 1/2013 | Westphal et al. | 244/119 |
| 2013/0020438 A1* | 1/2013 | Glynn et al. | 244/129.1 |
| 2013/0026297 A1* | 1/2013 | McCullough et al. | 244/131 |

* cited by examiner

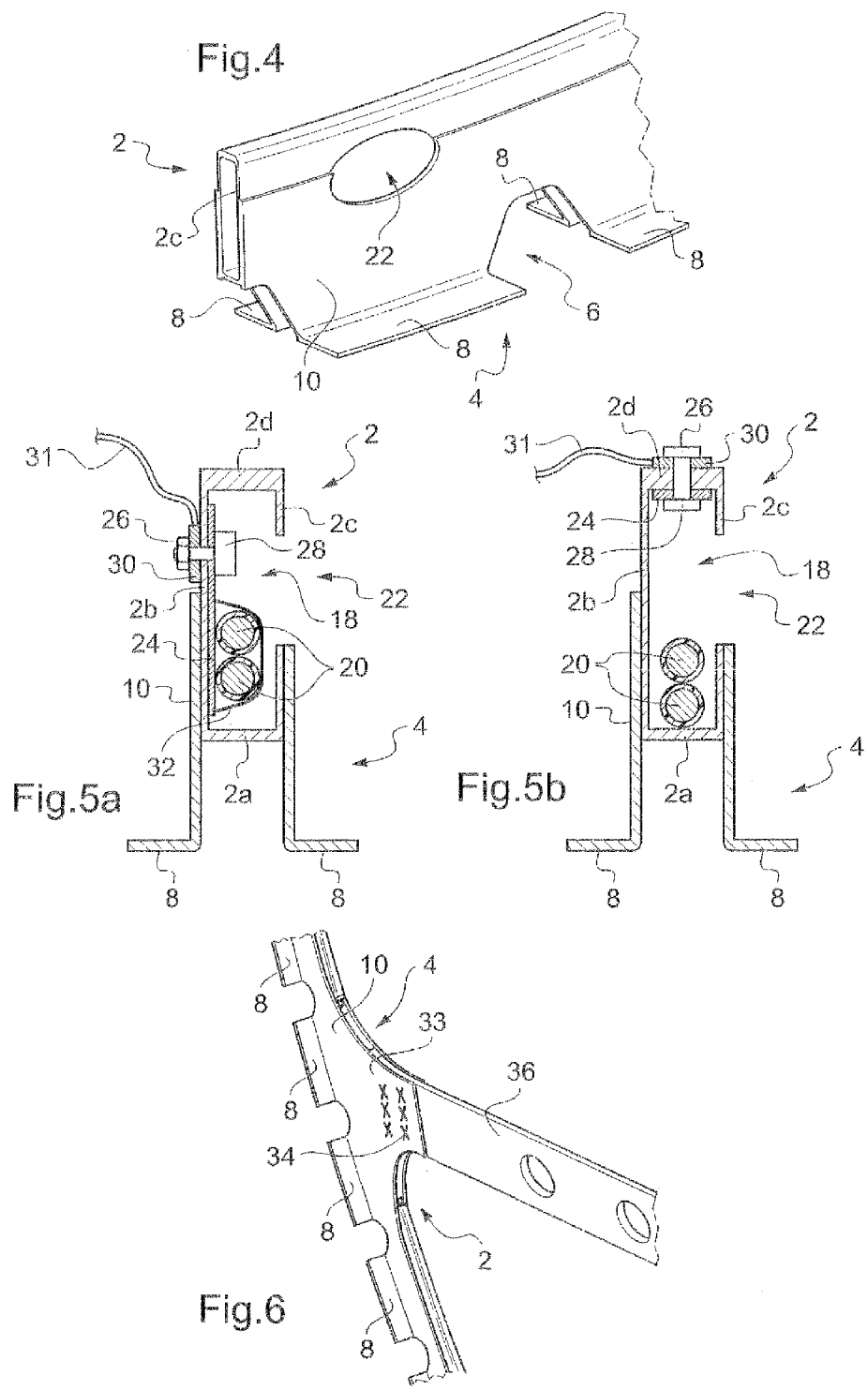

ANTI LATERAL-TORSIONAL BUCKLING STRUCTURAL MEMBER OF AN AIRCRAFT FUSELAGE

CROSS REFERENCE TO RELATED APPLICATION

This application is entitled to and claims the benefit of French Application No. FR 2011 62138 filed Dec. 21, 2011, the disclosure of which, including the specification, drawings and abstract, is incorporated herein by reference in its entirety.

FIELD

The invention relates to a mechanical structure, more particularly to an aircraft fuselage structure.

BACKGROUND

Generally, aircraft fuselage structures consist of a skin to which stiffeners or frames are fixed, either directly (integral frames) or using clips. These frames usually consist of I-section or Z-section metal hoops. These structures comprise moreover stringers placed perpendicularly to the frames.

Parts called cleats are used to connect the frames to the stringers, in particular to prevent the frames from bowing, by lateral-torsional buckling, when they are mechanically stressed.

Document WO 2009/037006 discloses a structural component for the fuselage of an aircraft or spacecraft comprising a hollow profile and a support of this profile comprising a foot by which the component is fixed to the skin.

The support disclosed in this document adopts the function of the clips and the cleats and each of them is placed between each stringer over the whole length of the profile.

In this document and in the other structures of the prior art, the numerous parts required for the mechanical resistance of the structure and the complexity of their form involve significant costs. Moreover, assembling the clips and the cleats on the panel between each stringer is a complex and lengthy operation due to the adjustments that it requires, in particular taking account of the tolerances to be complied with.

SUMMARY

The invention proposes to overcome at least one of the above drawbacks.

To this end, it relates to an element of an aircraft fuselage structure, the structural member comprising a profile elongated in a longitudinal direction, that is hollow over at least a portion of its length and that is mounted on two legs, each leg comprising a first portion extending continuously over the whole length of the profile and a second portion extending substantially from said continuous portion so as to form in the longitudinal direction of the profile several openings that are spaced apart, the legs being formed of two separate plates each fixed at the level of the body, on one of the two opposite flanks of the profile respectively. The hollow profile allows the structural member to be made particularly resistant to torsional and flexural stresses and thus less subject to lateral-torsional buckling.

Moreover, the legs advantageously replace the clips in their function of fastening the structural member to the skin by means of their longitudinal extension.

Their continuous extension over the whole length of the profile makes it possible, in conjunction with the presence of the profile, to produce a structural member that is so little subject to lateral-torsional buckling that cleats can be dispensed with.

Thus, the invention makes it possible to simplify the architecture of a structure of this type by reducing the number of parts involved. In this way, the time and associated production costs are reduced, as well as the assembly time and cost. Finally, the reduction in the number of parts and mounting elements contributes to reducing the mass of the assembly, which is particularly noticeable in the context of an aeronautical application.

Due to the absence of the clips and cleats, some problems associated with their adjustment, more particularly associated with the assembly tolerance, are also solved.

In addition, it is possible to manufacture the profile, a part that has a simple, conventional shape, on the one hand, and each of the plates constituting the legs, on the other hand, which simplifies the manufacturing process.

The structural member is therefore constituted by parts that have simple forms and are therefore particularly easy to manufacture, needing only to be attached by co-firing, bonding or screwing.

According to a possible feature, each of the openings formed by the legs follows the contour of the cross-section of a through-hole element having a form that is generally elongated in a direction transverse to the longitudinal direction of the structural member.

In particular, the opening follows the contour of the stringer in order to further reinforce the structure.

In order to give the structural member good resistance to lateral-torsional buckling, the profile has a closed cross-section.

So as to simplify the production of the structural member, the legs comprise at their free ends feet that extend in a plane so that each plate forms a right-angle between the plane of the feet and the flank of the profile.

In a particular embodiment, the profile-legs assembly can be produced, for example by moulding if the chosen material is of the composite type, in a single piece.

According to a possible feature, the legs constitute an extension of the profile in the direction perpendicular to the longitudinal direction of the profile.

According to a possible feature, the structural member is produced from composite or metal material.

As the structural member can be produced in only one or two parts and as it has a simple form, it is particularly suitable for production from composites.

Thus the structural member can be manufactured from a blank produced by braiding or laying of multiaxial dry fibres and reinforced by unidirectional fibres (UD) placed in the longitudinal direction of the profile.

If the structure to be reinforced is an aircraft fuselage, the structural member will preferably be produced based on carbon fibres, which are both light and strong. Other fibres with comparable properties can however be envisaged.

Alternatively, the structural member is produced from titanium or aluminium, or any other metals that are both light and strong.

In an aircraft fuselage structure, equipment such as cable routing or lines intended for conveying various fluids such as oxygen, conditioned air, fuel, water, etc. are usually fixed to the frame using clips, which makes the assembly even more complex and the structure heavier.

According to a possible feature, the invention makes it possible to place one or more items of equipment inside the hollow profile.

It is not therefore necessary to provide external fastening elements for this (these) item(s) of equipment. The latter are also protected from various kinds of damage such as cuts, impacts, etc.

According to a possible feature, the structural member comprises at least one aperture made in a side wall giving access to the inside of the profile.

In particular, this aperture is also made in a leg, for example in its first portion. Alternatively it can be made in both legs, and/or on one or more faces/walls of the profile.

When elements such as lines or cable routing are present inside the profile, such an aperture allows in particular easy access thereto and the performance of any maintenance required.

The shape and size of this aperture are also chosen so as to limit the possible impact of its presence on the mechanical resistance of the reinforcement. It will be noted moreover that several apertures can thus be provided, spaced apart in the longitudinal direction of the profile.

According to a particular feature, the profile has a substantially rectangular cross-section.

A rectangular cross-section makes it possible to give the structural member good mechanical resistance to torsion and thus prevent the lateral-torsional buckling of the structure. Moreover, it makes it easier to position supporting or electrically conductive elements on the inner faces of its walls, as will be seen hereinafter.

However, other profile sections can also be envisaged, such as a square, circular or elliptical cross-section.

Preferably, the chosen cross-sections make it easier to position the aforementioned connecting or air conditioning equipment in their hollow portion.

According to a possible feature, the structural member comprises at least one strip of conductive material associated with the profile. For example, said at least one strip is firmly fixed to at least one inner face of the profile. This association is made in order to ensure a return current function ("bonding").

The use of such a strip is particularly applicable when electric cables are extended in the hollow portion of the profile. This strip can be placed on any inner face of the profile, for example a face of a side wall. It is advantageously connected to a wire, for example via its fastening means, which itself is connected to earth.

In order to give an additional function to the strip of conductive material, the latter is placed inside the profile. This arrangement makes it possible in particular to contribute to the structural resistance of the profile.

More particularly, the strip is placed on the inner face of the upper wall of the profile if the latter has a rectangular cross-section, or more generally on the inner face of the upper portion of the profile in order to give greater mechanical resistance to the structural member.

Advantageously, the strip of conductive material is produced from a metal alloy.

In particular, if the principal requirement is for the strip to be conductive, the latter can be produced from copper or bronze.

Alternatively, if there is also a requirement for the strip to contribute to the structural resistance of the structural member while remaining conductive, the strip is produced from aluminium.

According to a possible feature, the whole of the inner surface of the profile is metallized.

In this way, electrical shielding is produced for any routing of electric cables inside the hollow profile.

According to a possible feature, the structural member comprises an axial extension having an axis forming a non-zero angle with the longitudinal direction of the profile, said axial extension being intended for fastening structural members the longitudinal direction of which forms an intersection with the plane of the feet of the legs.

Such an extension makes it possible in particular to connect the structural member to a surrounding structure. In particular, if the structure is an aircraft fuselage, this can be frame sectors or floor or hold crossmembers.

The extension is either a continuation of the legs in a direction substantially opposite to that of the skin, or a continuation of the flanks of the profile. This can moreover be a new element fixed to one of said elements.

The invention also relates to an aircraft comprising a structural member such as briefly mentioned above.

BRIEF DESCRIPTION OF THE DRAWINGS

Other characteristics and advantages will become apparent during the following description given by way of non-limitative example with reference to the attached drawings, in which:

FIG. 4 is a diagrammatic perspective representation of the structural member in FIG. 1 according from a different viewing angle;

FIG. 5a is a diagrammatic view of a cross-section of the structural member according to the invention in a third embodiment;

FIG. 5b is a diagrammatic view of a cross-section of the structural member according to the invention in a fourth embodiment;

FIG. 6 is a diagrammatic perspective view of a structural member according to the invention in a fifth embodiment and of a structural element transverse thereto.

DETAILED DESCRIPTION OF EMBODIMENTS

Figure 1:
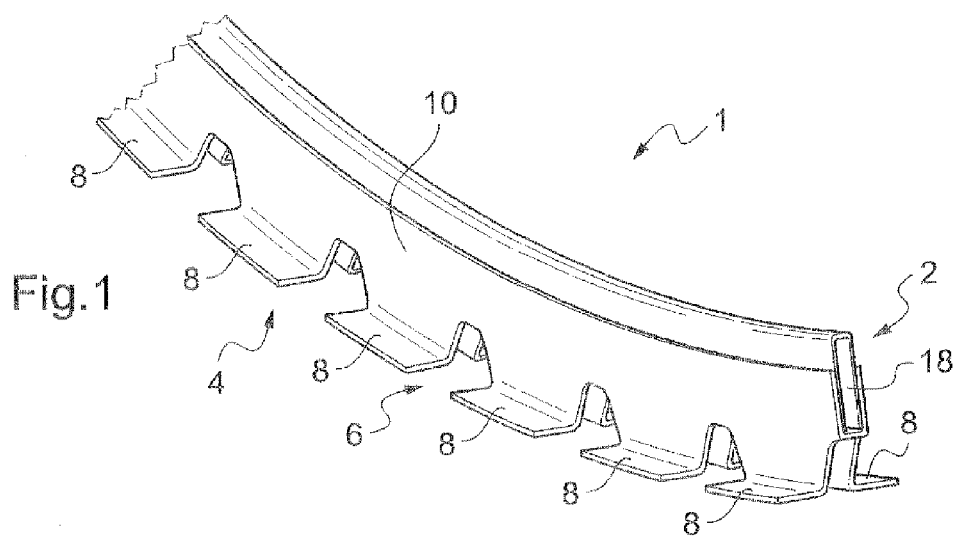
FIG. 1 is a diagrammatic perspective representation of a structural member according to the invention in a first embodiment.

The structural member 1 shown in FIG. 1 has a generally elongated form, extending in a longitudinal direction.

It comprises a hollow profile 2, having a cross-section that is for example rectangular in FIG. 1 and the following figures, mounted on legs 4. The profile is always shown as hollow over its entire length but it can be envisaged that it may be solid in certain sections.

Each leg 4 comprises a first portion or body 10 that extends in the direction of the longitudinal axis of the profile 2, continuously over the whole length of the profile 2.

Each leg 4 also comprises a second portion that extends in a direction substantially perpendicular to that of the longitudinal axis of the profile 2, on either side of several openings 6 each intended to receive a stringer. These stringers are in particular shown in FIG. 2.

The longitudinal extension of the leg 4 is therefore divided into several feet 8 on either side of the openings 6. The feet 8 are in the form of a right-angle so as to be in planar contact with a skin.

The body 10 therefore extends above the openings 6 and links the feet 8 of the legs 4 which each form a right angle with the body.

The hollow profile 2 allows the structural member 1 to be made particularly resistant to torsional and flexural stresses and thus less subject to lateral-torsional buckling.

The feet 8 of the legs 4 make it possible to fix the structural member 1 to a structure such as an aircraft fuselage skin. Their right-angle shape allows them to perform a function comparable to that of clips commonly used in this field.

It will be noted that the two legs are placed on either side of the profile 2, thus framing the latter. The profile 2 extends partially above the legs according to a view in the vertical position as in FIGS. 1 and 2.

Preferably, all of the parts constituting the structural member 1 are produced from composite materials. For example, the profile 2 is reinforced by unidirectional carbon fibres extending along the longitudinal direction of the profile.

Alternatively, the structural member 1 is produced from metal materials such as aluminium.

Figure 2:
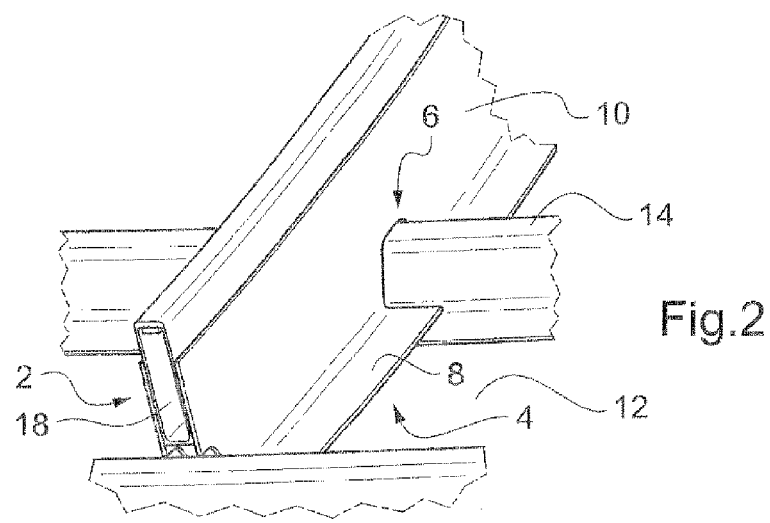
FIG. 2 is a diagrammatic perspective representation of the structural member in FIG. 1 fixed to a skin of an aircraft fuselage structure and passed through by a stringer of said same structure.

FIG. 2 shows the positioning of the structural member 1 in a surrounding structure comprising a skin 12 (for example the skin of an aircraft fuselage) and stringers 14.

The stringers 14, constituted by profiles, here omega-section profiles, extend in a longitudinal direction different from the longitudinal direction of the profile 2 of the structural member 1. In the case in point, these two directions are substantially perpendicular.

The structural member 1 is placed so that the openings 6 allow the stringers 14 to pass through them. Thus each stringer 14 passes through an opening 6 that is made in the shape of a mousehole in order to follow the contour of the cross-section of the stringer.

The feet 8 are in planar contact with the skin 12 due to their right-angle shape. They are for example fixed by bonding, screwing or welding depending on the nature of the material from which the structural member is made.

It will be noted that advantageously, the continuous extension of the body 10 (first portion of the leg) over the whole length of the profile 2 makes it possible, in conjunction with the presence of the profile 2, to render the structural member 1 so little subject to lateral-torsional buckling that cleats connecting the body 10 to each stringer 14 can be dispensed with.

Figures 3A, 3B:
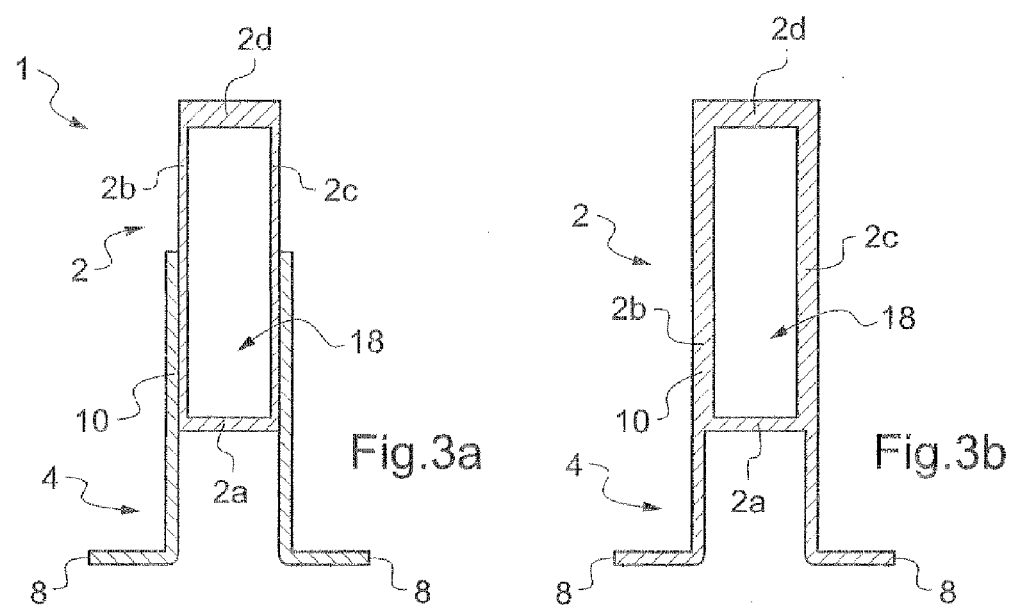
FIG. 3a is a diagrammatic representation of a cross-section of the structural member in FIG. 1.
FIG. 3b is a diagrammatic representation of a cross-section of a structural member according to the invention in a second embodiment.

FIGS. 3a and 3b show two possible designs for the legs 4 and the profile 2.

In the first embodiment shown in FIG. 3a, which corresponds to the embodiment in FIG. 1, the legs 4 are formed from two separate plates, each fixed at the level of the body 10 respectively on one of the two opposite flanks of the profile 2, approximately at mid-height of the latter.

Depending on the nature of the material from which the profile 2 and the legs 4 are produced, the latter are fixed to each other by bonding, screwing or welding.

Such a design makes it possible to simplify the production of the structural member 1. It is then possible to manufacture the profile 2, a part that has a simple, conventional shape, on the one hand, and each of the plates constituting the legs 4, on the other hand.

Alternatively, in a second embodiment shown in FIG. 3b, the profile 2 and the legs 4 are produced in a single piece, the body 10 and the flanks of the profile 2 being one single element.

The advantage of such a design is that it does not suffer from structural weakness at the level of any fastening between the profile 2 and the legs 4 since the latter form a single piece only.

Within the context of the invention, the inside of the profile 2, or cavity 18 shown in the previous figures, is advantageously used in order to place various items of equipment therein, such as cable routing, lines intended for the transport of fluids (oxygen, conditioned air, compressed air, fuel, water, etc.) as well as other elements allowing the latter to be electrically or thermally insulated.

Thus, it is not necessary to provide fastening devices outside the profile for these items of equipment, as is the case around the structural frames of the aircraft fuselage in the prior art. Moreover, the items of equipment placed in the cavity 18 therefore benefit from additional protection against any damage they are likely to undergo, such as cuts, impacts, etc.

In order to gain access to such items of equipment, a port or aperture 22, shown in FIG. 4, is made in the body 10 and the wall or flank 2c (right flank) of the profile.

In the embodiment shown in FIG. 4, the port 22 has an elliptical shape, but other shapes, circular, rectangular or other can also be envisaged. In any case, the shape and size of the ports 22 are chosen so as to facilitate maintenance operations or other types of operations while limiting the impact that their presence might have on the mechanical resistance of the structural member 1.

Although a single port 22 is shown here, it will be rioted that several ports 22 can be made in the flank 2c of the profile, for example spaced out along the profile, evenly or otherwise, in order to carry out such operations.

Moreover, if the structural member 1 is used as a structural reinforcement of the aircraft fuselage, ports 22 can be made for example at the level of the floor and ceiling of an aircraft cabin.

Finally, making ports 22 in the wall or flank 2b opposite the flank 2c of the profile, as well as optionally in the corresponding portion of the body 10, is not excluded.

A person skilled in the art will easily understand that due to the fact that the cross-section of the profile 2 is symmetrical, flanks 2b and 2c are interchangeable in all of the following.

FIGS. 5a and 5b show two possibilities for placing elements/items of equipment in the cavity 18. These figures use the embodiment shown in FIG. 3a.

In a first embodiment shown in FIG. 5a, two electric cables 20 are placed in the cavity 18.

A conductive plate or strip 24 is placed on one of the inner faces of the walls of the profile 2, for example on the wall 2b (left flank) in FIG. 5a.

The conductive plate 24 is fixed using a bolt 26 and a nut 28 to the wall 2b. A washer 30 is placed between the bolt 26 and the wall 2b. An electric wire 31, made of conductive material, is connected to the washer 30.

A conductive strap 32 (for example made of metal) is for example placed around the cables in contact with the conductive plate 24.

In the embodiment shown in FIG. 5a, the conductive plate 24, in combination with the nut and bolt system 26, 28, the washer 30 and the electric wire 31, has the function of providing a return current and thus insulates the electric cabling.

The current passing through the conductive plate 24 passes through the bolt 26 and the washer 30, then into the electric wire 31 connected to earth.

The washer 30 also makes it possible to protect the wall 2b of the profile 2.

The conductive strap 32 has the function in particular of contributing to the electrical and mechanical shielding of the cables routed in the cavity 18.

In this embodiment, the conductive plate 24 is preferably produced from a metal material that is highly electrically conductive, for example copper or bronze, as is the strap.

In the alternative embodiment shown in FIG. 5b, the conductive plate 24 is positioned on the inner face of the upper wall 2d of the profile 2 so as not only to provide the return current function, but also to contribute to the mechanical resistance of the profile 2.

The bolt 26, the nut 28, the washer 30 and the electric wire 31 here keep their position and function regardless of the inner face of the profile 2 on which they are placed.

In the embodiment shown in said FIG. 5b, the conductive plate 24 will preferably be made from a metal material offering a compromise between conductivity and mechanical resistance such as aluminium.

Another alternative embodiment, not shown, envisages placing the fastening system of the conductive plate 24, namely the bolt and nut system 26, 28, between the two cables 20.

Another alternative embodiment, not shown, includes the metallization of all of the inner faces of the walls of the profile 2, regardless of its shape.

The structural member 1 according to the invention also allows support to be provided to other elements of the structure, in particular elements transverse to the plane of the skin 14.

To this end, the bodies 10 of the legs 4 of the structural member 1 shown in FIG. 6 each have an axial extension 33 the axis of which forms a non-zero angle with the longitudinal direction of the profile 2. Each axial extension extends distally from the feet 8 of the leg in question.

The axial extensions 33 facing each other form a jaw in which is placed a structural member 36 which is here for example constituted by a plate having an elongated form pierced by circular holes.

A fastening device 34 makes it possible to fix the element 36 to the axial extensions (anchoring components) and depends on the nature of the materials from which the structural member 1 and the structural member 36 are produced. Depending on the choice of materials, a person skilled in the art will be able to choose a suitable fastening method, iii particular from screwing, bonding or welding.

The invention claimed is:

1. A structural member of an aircraft fuselage, the structural member comprising:
    a profile elongated in a longitudinal direction, the profile being hollow over at least a portion of its length, the profile comprising two opposite flanks; and
    two legs on which said profile is mounted, each leg comprising a first portion extending continuously over the whole length of the profile and a second portion extending from said first portion so as to form in the longitudinal direction of the profile several openings that are spaced apart, wherein the legs are formed of two separate plates each fixed at the level of the first portion, on one of the two opposite flanks of the profile respectively.

2. The structural member of an aircraft fuselage according to claim 1, wherein each of the openings follows a contour of a cross-section of a through-hole element having a form that is generally elongated and oriented in a direction transverse to the longitudinal direction of the profile.

3. The structural member of an aircraft fuselage according to claim 1, wherein the profile has a closed cross-section.

4. The structural member of an aircraft fuselage according to claim 1, wherein the profile has a substantially rectangular cross-section.

5. The structural member of an aircraft fuselage according to claim 1, wherein the legs comprise at their free ends feet that extend in a plane such that each plate forms a right angle between a plane of the feet and one or more of the flanks of the profile.

6. The structural member of an aircraft fuselage according to claim 1, wherein the profile and the legs comprise composite or metal material.

7. The structural member of an aircraft fuselage according to claim 1, further comprising one or more items of equipment disposed inside the profile which is hollow over at least a portion of its length.

8. The structural member of an aircraft fuselage according to claim 1, wherein the profile and one of the legs form at least one aperture giving access to the inside of the profile.

9. The structural member of an aircraft fuselage according to claim 1, further comprising at least one strip of conductive material associated with the profile.

10. The structural member of an aircraft fuselage according to claim 9, wherein the strip of conductive material is disposed inside the profile.

11. The structural member of an aircraft fuselage according to claim 9, wherein the strip of conductive material comprises a metal alloy.

12. The structural member of an aircraft fuselage according to claim 1, wherein a whole inner surface of the profile is metallized.

13. The structural member of an aircraft fuselage according to claim 1, further comprising at least one axial extension having an axis forming a non-zero angle with the longitudinal direction of the profile, said axial extension being intended for fastening elements of a structure the longitudinal direction of which forms an intersection with the plane of the feet of the legs.

14. An aircraft comprising a structural member of an aircraft fuselage according to claim 1.

* * * * *